(12) United States Patent
Okamoto (10) Patent No.: US 11,970,149 B2
(45) Date of Patent: Apr. 30, 2024

(54) ROTATION RESTRICTION CONTROL DEVICE, ROTATION RESTRICTION DEVICE, AND VEHICLE

(71) Applicant: Isuzu Motors Limited, Tokyo (JP)

(72) Inventor: Takefumi Okamoto, Fujisawa (JP)

(73) Assignee: Isuzu Motors Limited, Yokohama (JP)

( * ) Notice: Subject to any disclaimer, the term of this patent is extended or adjusted under 35 U.S.C. 154(b) by 0 days.

(21) Appl. No.: 17/927,936

(22) PCT Filed: Jun. 4, 2021

(86) PCT No.: PCT/JP2021/021304
§ 371 (c)(1),
(2) Date: Nov. 28, 2022

(87) PCT Pub. No.: WO2021/246504
PCT Pub. Date: Dec. 9, 2021

(65) Prior Publication Data
US 2023/0202433 A1 Jun. 29, 2023

(30) Foreign Application Priority Data
Jun. 5, 2020 (JP) .................. 2020-098570

(51) Int. Cl.
*F16D 41/00* (2006.01)
*B60T 1/06* (2006.01)
*B60T 7/12* (2006.01)
*F16H 59/66* (2006.01)
*F16H 63/34* (2006.01)

(52) U.S. Cl.
CPC .............. *B60T 7/122* (2013.01); *B60T 1/062* (2013.01); *F16D 41/00* (2013.01); *F16H 59/66* (2013.01);
(Continued)

(58) Field of Classification Search
CPC ...... B60T 7/122; B60T 1/062; B60T 2201/06; B60T 1/06; B60T 7/12; F16H 59/66;
(Continued)

(56) References Cited

U.S. PATENT DOCUMENTS 6,411,881 B1 * 6/2002 Thomas ............. B60W 10/184
701/67
2005/0246081 A1 * 11/2005 Bonnet .................. B60T 7/122
280/5.502
(Continued)

FOREIGN PATENT DOCUMENTS

JP  2001-289317    10/2001
JP  2007-106327    4/2007
(Continued)

OTHER PUBLICATIONS

Machine translation of JP 2017067138 A (Year: 2017).*
(Continued)

*Primary Examiner* — Jacob S. Scott
*Assistant Examiner* — Farhana Pervin (57) ABSTRACT

A rotation restriction control device comprises a selection unit that selects a rotation restriction state, on the basis of a road surface when parking a vehicle traveling on the road surface, and a control unit that controls a rotation restriction state of a restriction mechanism in accordance with a selection result from the selection unit when parking the vehicle.

6 Claims, 4 Drawing Sheets (52) U.S. Cl.
CPC ...... *F16H 63/3416* (2013.01); *B60T 2201/06* (2013.01); *F16H 2059/663* (2013.01)

(58) Field of Classification Search
CPC ........... F16H 2059/663; F16H 63/3416; F16H 63/486; F16H 63/48
See application file for complete search history.

(56) References Cited

U.S. PATENT DOCUMENTS

| | | | | |
|---|---|---|---|---|
| 2008/0217123 | A1* | 9/2008 | Fujita | B60W 30/18109 |
| | | | | 188/161 |
| 2010/0048354 | A1* | 2/2010 | Leibbrandt | F16H 61/688 |
| | | | | 477/172 |
| 2018/0283504 | A1* | 10/2018 | Ishikawa | F16H 63/3425 |

FOREIGN PATENT DOCUMENTS

| | | |
|---|---|---|
| JP | 2011-117561 | 6/2011 |
| JP | 2017-067138 | 4/2017 |
| WO | WO 2021/246504 | 12/2021 |

OTHER PUBLICATIONS

International Search Report and the Written Opinion dated Jul. 6, 2021 From the International Searching Authority Re. Application No. PCT/JP2021/021304 and Its Translation of Search Report Into English. (8 Pages).

* cited by examiner

//  ROTATION RESTRICTION CONTROL DEVICE, ROTATION RESTRICTION DEVICE, AND VEHICLE

TECHNICAL FIELD

The present disclosure relates to a rotation restriction control apparatus, a rotation restriction apparatus, and a vehicle.

BACKGROUND ART

Conventionally, a vehicle provided with a parking mechanism that restricts rotation of a gearbox during parking has been known (for example, see Patent Literature (hereinafter, referred to as "PTL") 1). Such a parking mechanism includes a parking gear and the like, and brings the vehicle into a parking state based on manipulation of a manipulation lever by a driver, operation of an actuator in the mechanism, and the like.

CITATION LIST

Patent Literature

PTL 1
Japanese Patent Application Laid-Open No. 2001-289317

SUMMARY OF INVENTION

Technical Problem

However, when the vehicle is in the parking state on an inclined road surface such as a slope, a large load is applied to the parking mechanism due to the weight or the like of the vehicle stopping on the inclined road surface. Thus, there is a possibility that the load affects the manipulability at the time of parking release.

An object of the present disclosure is to provide a rotation restriction control apparatus, a rotation restriction apparatus, and a vehicle capable of improving manipulability at the time of parking release.

Solution to Problem

A rotation restriction control apparatus according to the present disclosure is
a rotation restriction control apparatus for a vehicle including a restriction mechanism in which a rotation restriction state is selectable from among at least two states including a first state in which rotation only in a forward direction is restricted in a gearbox and a second state in which rotation only in a reverse direction is restricted in the gearbox, the rotation restriction control apparatus including:
a selection section that selects the rotation restriction state based on a road surface on which the vehicle travels and where the vehicle enters a parking state; and
a control section that controls the rotation restriction state of the restriction mechanism depending on a selection result of the selection section when the vehicle enters the parking state.

A rotation restriction apparatus according to the present disclosure includes:
a restriction mechanism disposed on a power transmission side of a gearbox mounted in a vehicle, the restriction mechanism in which a rotation restriction state is selectable from among at least two states including a first state in which rotation only in a forward direction is restricted in the gearbox and a second state in which rotation only in a reverse direction is restricted in the gearbox; and
the above-described rotation restriction control apparatus.

A vehicle according to the present disclosure is a vehicle including:
a gearbox; and
the above-described rotation restriction apparatus.

Advantageous Effects of Invention

According to the present disclosure, it is possible to improve manipulability at the time of parking release.

DESCRIPTION OF EMBODIMENTS

Figure 1:
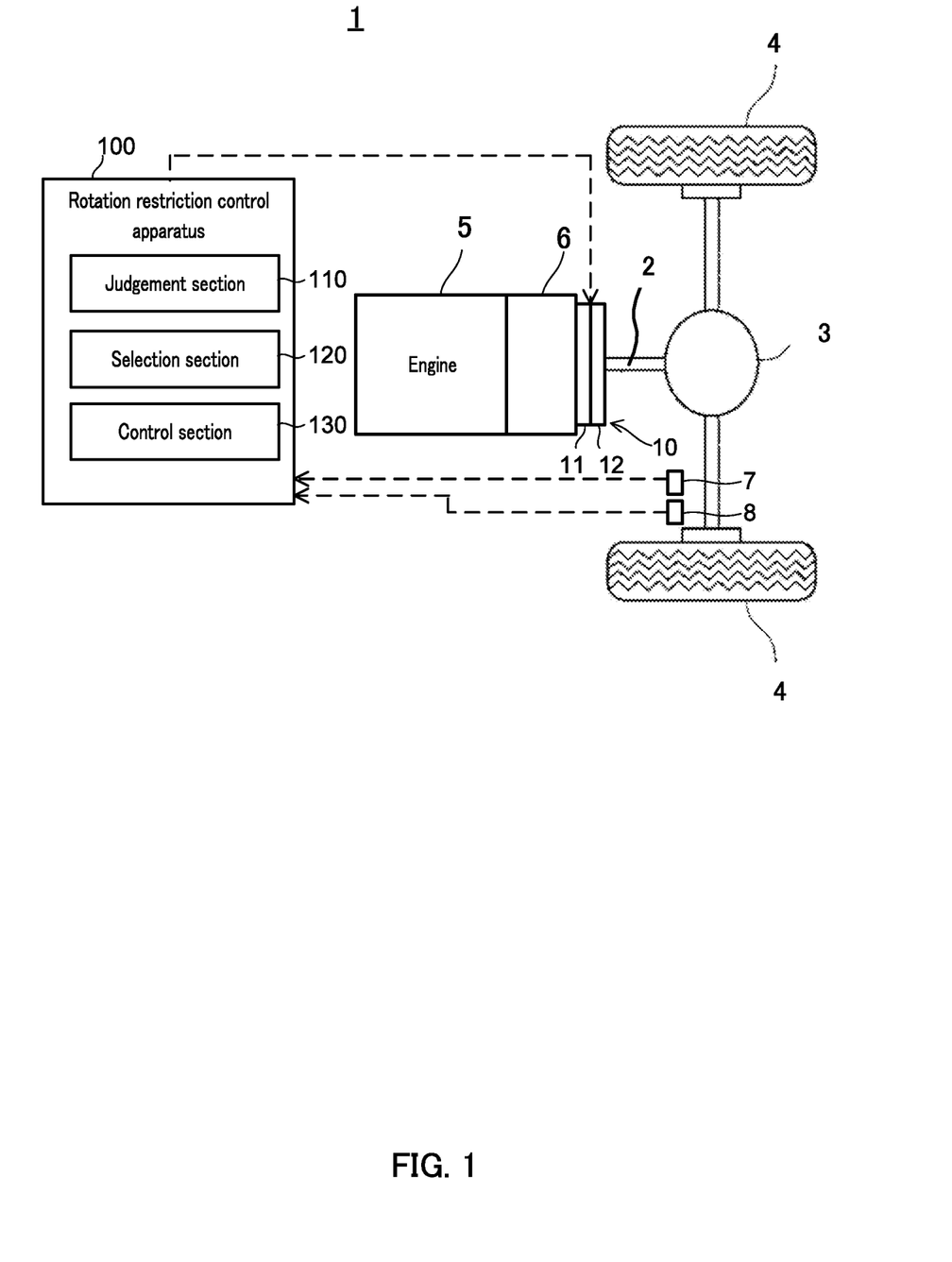
FIG. 1 is a diagram illustrating a configuration of a vehicle including a rotation restriction control apparatus according to an embodiment of the present disclosure.

Hereinafter, the present embodiment will be described in detail with reference to the accompanying drawings. FIG. 1 is a diagram illustrating a configuration of vehicle 1 including rotation restriction control apparatus 100 according to an embodiment of the present disclosure.

As illustrated in FIG. 1, vehicle 1 includes propeller shaft 2, differential gear 3, drive wheels 4, engine 5, transmission 6, gradient sensor 7, parking signal output section 8, restriction mechanism 10, and rotation restriction control apparatus 100.

Engine 5 is, for example, an internal combustion engine such as a diesel engine. The power of engine 5 is transmitted to transmission 6 via a clutch (not illustrated), and the power transmitted to transmission 6 is transmitted to drive wheels 4 via propeller shaft 2 and differential gear 3.

Transmission 6 is, for example, a gearbox such as a manual transmission or an automatic transmission (for example, an Automated Manual Transmission (AMT), and includes a plurality of gear stages. In other words, transmission 6 includes a transmission mechanism or the like that connects or disconnects an output shaft of engine 5 to or from propeller shaft 2 and changes the transmission ratio.

Gradient sensor 7 is a known sensor that detects gradient information on the gradient of a road surface on which vehicle 1 travels.

For example, when the position of the manipulation lever in vehicle 1 is in a parking range, parking signal output section 8 outputs to rotation restriction control apparatus 100 a parking signal indicating that vehicle 1 is in the parking state. Note that, the parking signal by parking signal output section 8 may be outputted based on a position other than the position of the manipulation lever.

Restriction mechanism 10 is a mechanism for restricting the rotation of transmission 6. Specifically, restriction mechanism 10 has a one-way clutch mechanism disposed on propeller shaft 2 on the power transmission side of transmission 6, and includes first one-way clutch 11 and second one-way clutch 12.

First one-way clutch 11 and second one-way clutch 12 are selectable one-way clutches configured such that a restricted state in which rotation of vehicle 1 in the forward direction or the reverse direction is restricted and a released state in which the restricted state is released are selectable in transmission 6.

First one-way clutch 11 is configured to be capable of restricting rotation of transmission 6 in the forward direction of vehicle 1. Second one-way clutch 12 is configured to be capable of restricting rotation of transmission 6 in the reverse direction of vehicle 1.

Note that a known configuration can be used for the configuration of first one-way clutch 11 and second one-way clutch 12, that is, the configuration of the selectable one-way clutches. Note also that first one-way clutch 11 and second one-way clutch 12 are fixed at appropriate positions such as on transmission 6.

Further, in FIG. 1, first one-way clutch 11 and second one-way clutch 12 are disposed in this order with respect to transmission 6, but the arrangement of first one-way clutch 11 and second one-way clutch 12 may be reversed. Further, first one-way clutch 11 and second one-way clutch 12 may be disposed adjacently to each other or may be disposed apart from each other.

Restriction mechanism 10 includes first one-way clutch 11 and second one-way clutch 12 and, therefore, is configured such that a rotation restriction state is selectable from among a first state, a second state, and a third state.

The first state is a state in which the rotation of transmission 6 only in the forward direction is restricted, and is also a state in which first one-way clutch 11 is in the restricted state and second one-way clutch 12 is in the released state.

The second state is a state in which the rotation of transmission 6 only in the reverse direction is restricted, and is also a state in which first one-way clutch 11 is in the released state and second one-way clutch 12 is in the restricted state.

The third state is a state in which the rotation of transmission 6 in both the forward direction and the reverse direction is restricted, and is also a state in which both of first one-way clutch 11 and second one-way clutch 12 are in the restricted state.

In addition, restriction mechanism 10 during traveling of vehicle 1 or the like is brought into a restriction release state in which the rotation restriction state is released. The restriction release state is a state in which both of first one-way clutch 11 and second one-way clutch 12 are in the released state.

Rotation restriction control apparatus 100 includes a Central Processing Unit (CPU), a Read Only Memory (ROM), a Random Access Memory (RAM), and input/output circuitry, which are not illustrated in the figures. Rotation restriction control apparatus 100 controls the rotation restriction state of restriction mechanism 10 based on a preset program. Rotation restriction control apparatus 100 includes judgement section 110, selection section 120, and control section 130.

Judgement section 110 obtains a detection result of gradient sensor 7 and judges the road surface on which vehicle 1 travels. For example, when the detection result of gradient sensor 7 is an upward gradient, judgement section 110 judges that the road surface is an upward inclined surface. When the detection result of gradient sensor 7 is a downward gradient, judgement section 110 determines that the road surface is a downward inclined surface. Judgement section 110 determines that the road surface is a flat surface when the detection result of gradient sensor 7 is neither an upward gradient nor a downward gradient, that is, when the detection result is a flat surface.

Selection section 120 selects the rotation restriction state of restriction mechanism 10 based on the road surface on which vehicle 1 travels and which is the judgement result on the road surface by judgement section 110.

Specifically, when the road surface is a downward inclined surface, selection section 120 selects the above-described first condition in which the rotation of transmission 6 only in the forward direction is restricted.

When the road surface is an upward inclined surface, selection section 120 selects the above-described second state in which the rotation of transmission 6 in the reverse direction is restricted.

When the road surface is a flat surface, selection section 120 selects the third state in which the rotation of transmission 6 in the forward direction and the reverse direction is restricted.

When vehicle 1 enters the parking state, control section 130 controls the rotation restriction state of restriction mechanism 10 in accordance with the selection result of selection section 120.

Specifically, based on the presence or absence of the parking signal outputted by parking signal output section 8, control section 130 recognizes whether or not vehicle 1 is in the parking state. Control section 130 recognizes that vehicle 1 is in the parking state when the parking signal is continuously obtained, and recognizes that vehicle 1 is not in the parking state when there is no output of the parking signal.

Figure 2A:
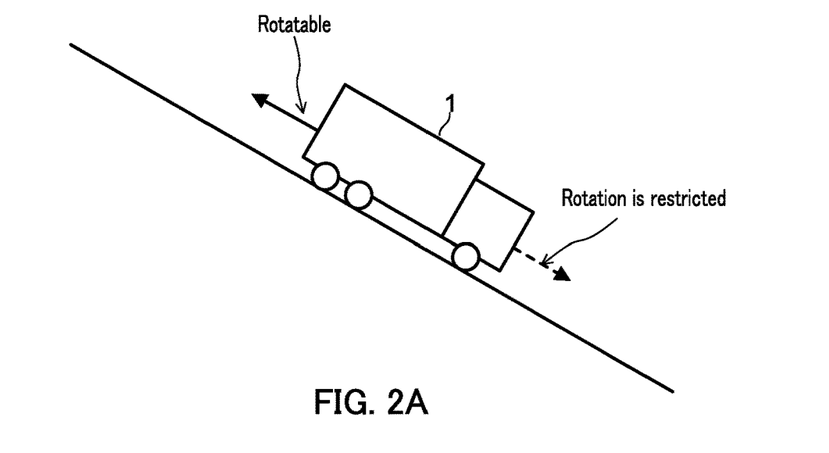
FIG. 2A is a diagram illustrating a vehicle in a parking state on a downward inclined surface.

When starting to obtain the parking signal, control section 130 recognizes that vehicle 1 enters the parking state, and when selection section 120 selects the first state (when the road surface is a downward inclined surface), control section 130 sets the rotation restriction state to the first state, that is, the state in which the rotation of transmission 6 only in the forward direction is restricted (see FIG. 2A).

Figure 2B:
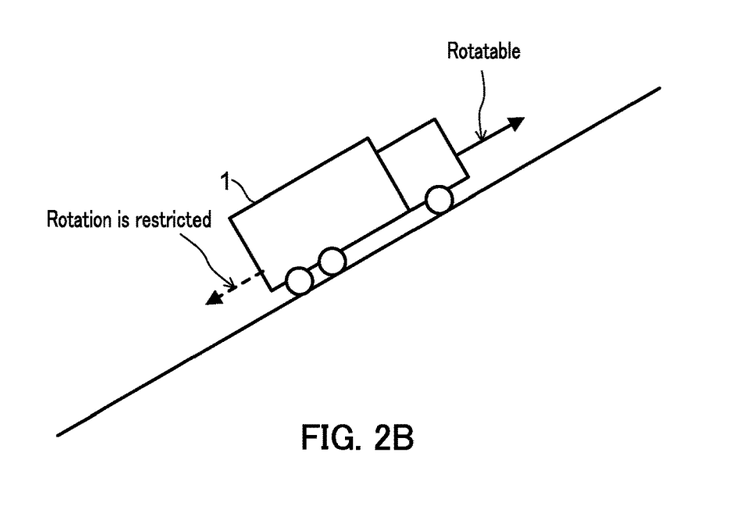
FIG. 2B is a diagram illustrating the vehicle in the parking state on an upward inclined surface.

When starting to obtain the parking signal, control section 130 recognizes that vehicle 1 enters the parking state, and when selection section 120 selects the second state (when the road surface is an upward inclined surface), control section 130 sets the rotation restriction state to the second state, that is, the state in which the rotation of transmission 6 only in the reverse direction is restricted (see FIG. 2B).

Figure 2C:
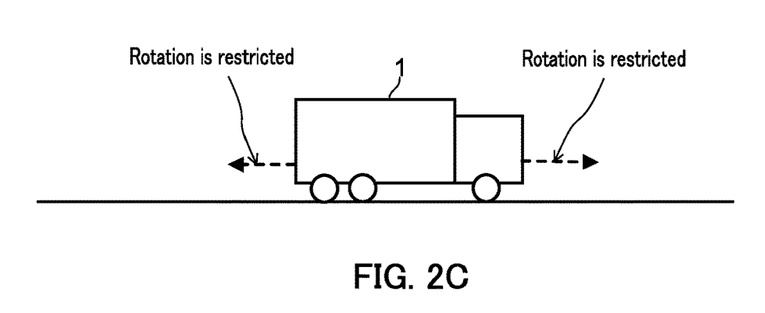
FIG. 2C is a diagram illustrating the vehicle in the parking state on a flat surface.

When starting to obtain the parking signal, control section 130 recognizes that vehicle 1 enters the parking state when the parking signal is obtained, and when selection section 120 selects the third state (when the road surface is a flat surface), control section 130 sets the rotation restriction state to the third state, that is, the state in which the rotation of transmission 6 in the forward direction and the reverse direction is restricted (see FIG. 2C).

With this configuration, in the present embodiment, the rotation restriction state of transmission 6 can be changed depending on the gradient of the road surface. For example, when vehicle 1 is in the parking state on the downward inclined surface, the rotation in the reverse direction in which vehicle 1 does not move by its own weight is not restricted, while the rotation only in the forward direction in which vehicle 1 moves by its own weight is restricted.

Further, when vehicle 1 is in the parking state on the upward inclined surface, the rotation in the forward direction in which vehicle 1 does not move by its own weight is not restricted, while the rotation only in the reverse direction in which vehicle 1 moves by its own weight is restricted.

That is, in the present embodiment, depending on the gradient of the road surface on which vehicle 1 enters the parking state, the rotation of transmission 6 only in the direction in which restriction of rotation is necessary is restricted. It is thus possible to reduce the load on a rotation restriction apparatus including restriction mechanism 10 and rotation restriction control apparatus 100.

In addition, when recognizing that vehicle 1 is not in the parking state, control section 130 sets the above-described restriction release state in which the rotation restriction state of restriction mechanism 10 is released. This allows vehicle 1 to travel in both the forward direction and the reverse direction.

Figure 3:
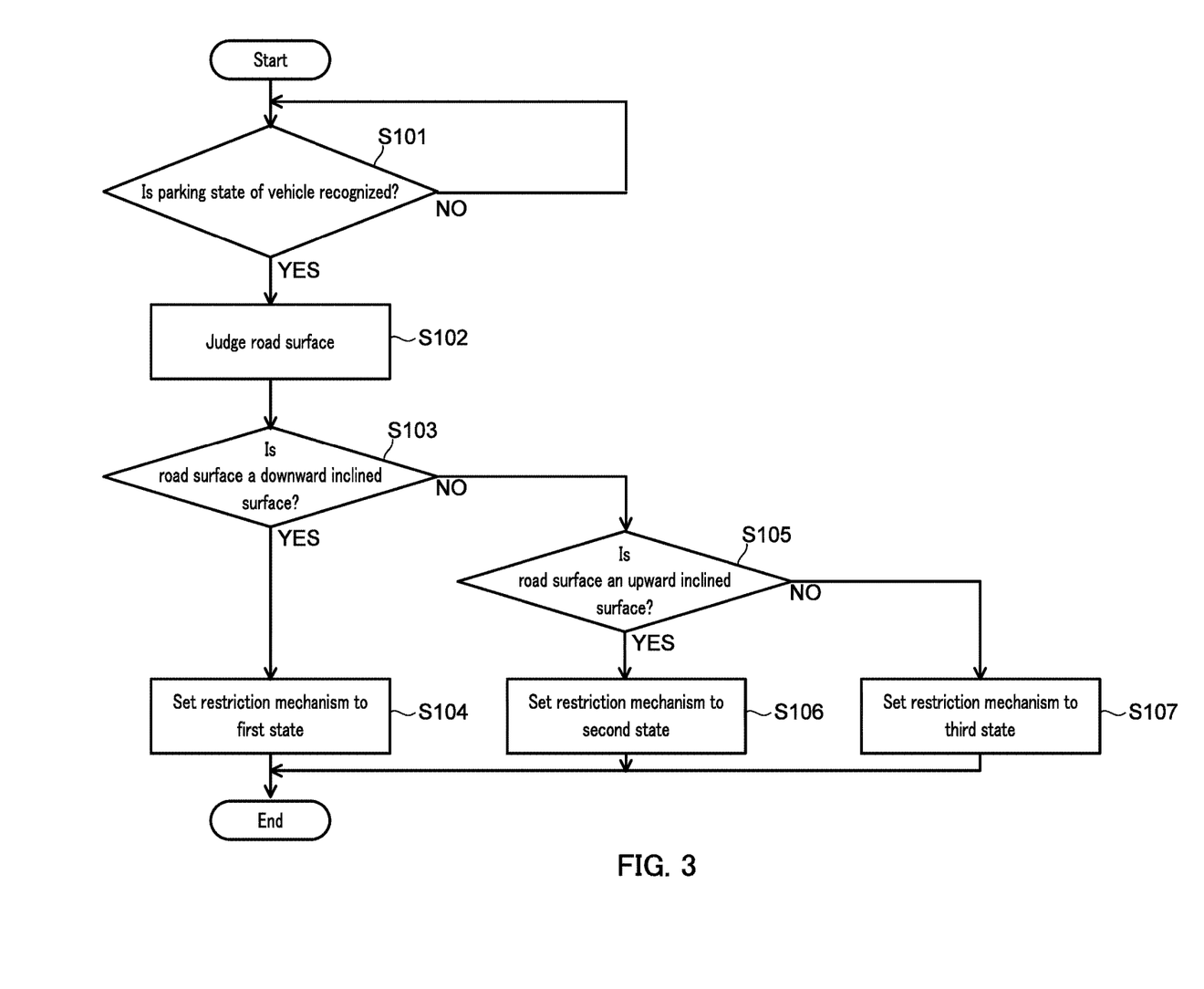
FIG. 3 is a flowchart illustrating one exemplary operation performed when a rotation restriction control in the rotation restriction control apparatus is executed.

Next, an operation example performed when the rotation restriction control in rotation restriction control apparatus 100 is executed will be described. FIG. 3 is a flowchart illustrating one exemplary operation performed when the rotation restriction control in rotation restriction control apparatus 100 is executed. The processing in FIG. 3 is appropriately executed when vehicle 1 starts traveling, that is, when restriction mechanism 10 is brought into the restriction release state.

As illustrated in FIG. 3, rotation restriction control apparatus 100 judges whether the parking state of vehicle 1 has been recognized (step S101).

When the judgement result indicates that the parking state of vehicle 1 has not been recognized (step S101: NO), the process of step S101 is repeated. On the other hand, when the parking state of vehicle 1 has been recognized (step S101: YES), rotation restriction control apparatus 100 judges the road surface (step S102) and judges whether or not the judged road surface is a downward inclined surface (step S103).

When the judgement result indicates that the road surface is a downward inclined surface (step S103: YES), rotation restriction control apparatus 100 selects the first state as the rotation restriction state to set restriction mechanism 10 to the first state (step S104).

On the other hand, when the road surface is not a downward inclined surface (step S103: NO), rotation restriction control apparatus 100 judges whether or not the road surface judged last in step S101 is an upward inclined surface (step S105).

When the judgement result indicates that the road surface is an upward inclined surface (step S105: YES), rotation restriction control apparatus 100 selects the second condition as the rotation restriction state to set restriction mechanism 10 to the second state (step S106).

On the other hand, when the road surface is not an upward inclined surface, that is, when the road surface is a flat surface (step S105: NO), rotation restriction control apparatus 100 selects the third state as the rotation restriction state to set restriction mechanism 10 to the third state (step S107). After step S104, step S106, or step S107, the present control ends.

Figure 4:
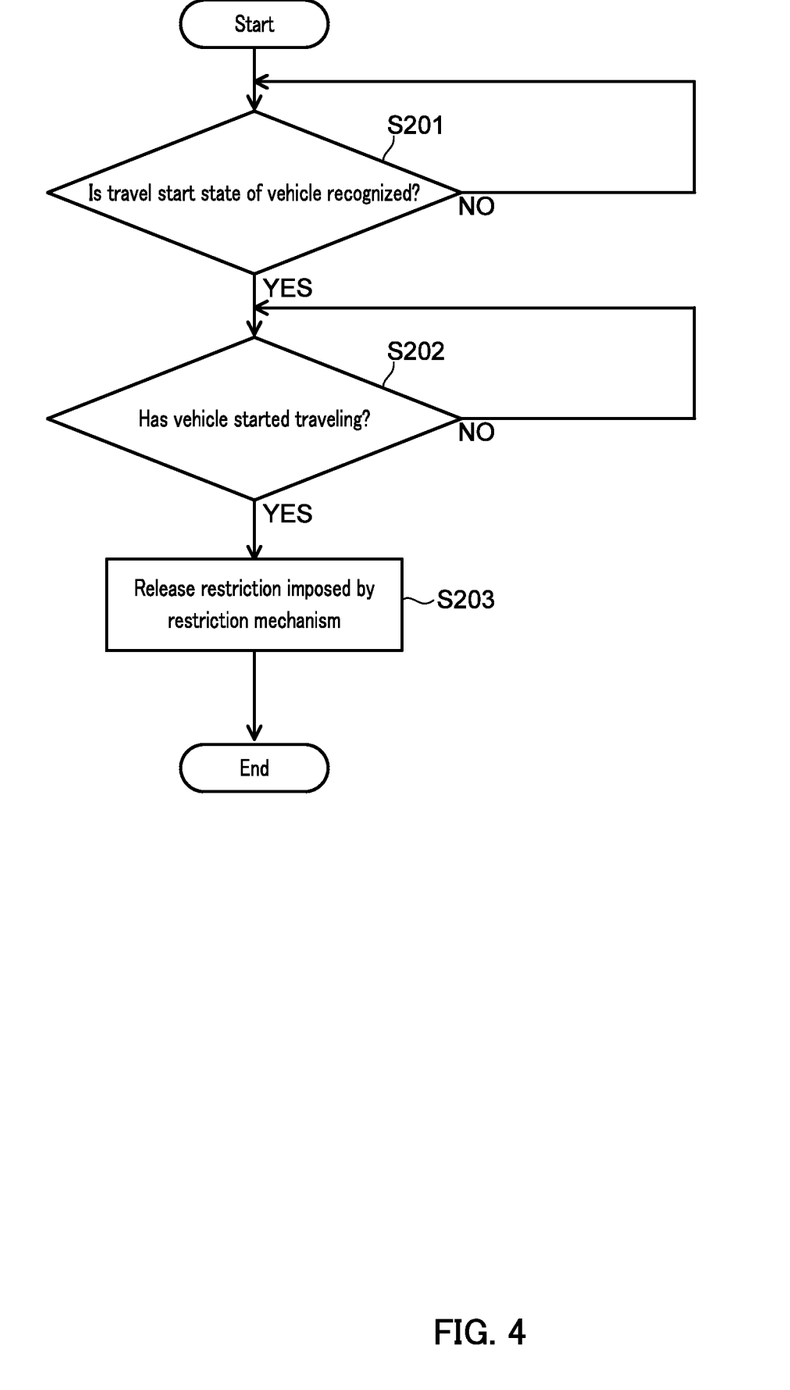
FIG. 4 is a flowchart illustrating one exemplary operation performed when a control for releasing the rotation restriction in the rotation restriction control apparatus is executed.

Next, an operation example performed when a control for releasing the rotation restriction in rotation restriction control apparatus 100 is executed will be described. FIG. 4 is a flowchart illustrating one exemplary operation performed when the control for releasing the rotation restriction in rotation restriction control apparatus 100 is executed. The processing in FIG. 4 is appropriately executed after the processing illustrated in FIG. 3 is executed, that is, when restriction mechanism 10 is in any one of the first state, the second state, and the third state.

As illustrated in FIG. 4, rotation restriction control apparatus 100 judges whether or not a travel start state of vehicle 1 is recognized (step S201). Rotation restriction control apparatus 100 recognizes the travel start state of vehicle 1, for example, when the position of the manipulation lever is in a drive range. When the judgement result indicates that the travel start state of vehicle 1 is not recognized (step S201: NO), the process of step S201 is repeated. On the other hand, when the travel start state of vehicle 1 is recognized (step S201: YES), rotation restriction control apparatus 100 judges whether or not vehicle 1 has started traveling (step S202). When the judgement result indicates that vehicle 1 has not started traveling (step S202: NO), the process of step S202 is repeated.

On the other hand, when vehicle 1 has started traveling (step S202: YES), rotation restriction control apparatus 100 sets the restriction release state in which the restriction by restriction mechanism 10 is released (step S203). After step S203, the control ends.

According to the present embodiment configured as described above, depending the gradient of the road surface on which vehicle 1 enters the parking state, the rotation of transmission 6 only in the direction in which restriction of rotation is necessary is restricted. It is thus possible to reduce the load on the rotation restriction apparatus including restriction mechanism 10 and rotation restriction control apparatus 100.

In the meantime, it is general that a parking gear or the like is disposed in a parking mechanism that restricts the rotation of a transmission during parking of a vehicle and the parking mechanism restricts the rotation of the transmission itself.

However, when the vehicle stops on the inclined road surface, a large load is applied to the parking mechanism in order to prevent the vehicle from descending due to its own weight. Therefore, in manipulation or operation for releasing the transmission that is performed when the vehicle starts from the inclined road surface, a force surpassing the load applied to the parking mechanism is required. Accordingly, in the general parking mechanism, there is a possibility that the manipulability at the time of parking release is affected.

In contrast, in the present embodiment, since the rotation of transmission 6 is restricted only in a direction in which it is necessary to restrict the rotation. It is thus possible to start the travel of the vehicle without releasing the restriction by restriction mechanism 10. That is, restriction mechanism 10 only needs to be released after the load is removed after the vehicle starts traveling. Accordingly, the present embodiment makes it possible to improve manipulability at the time of parking release.

Further, in the general parking mechanism, in order to prevent a vehicle from descending due to its own weight on an inclined road surface such as a slope, the parking mechanism is relatively large in size such that vehicle 1 is capable of stopping on the inclined road surface. Therefore, in order to dispose the parking mechanism as described above, a space for disposing the parking mechanism around the transmission is required.

Unlike this, in the present embodiment, restriction mechanism 10 including two one-way clutches 11 and 12 is disposed on an output shaft of transmission 6. It is thus possible to reduce the overall size of the parking mechanism.

Consequently, it is possible to eliminate the need to provide a space for disposing restriction mechanism 10 in the vicinity of transmission 6. In addition, it is possible to reduce the number of parts since it is not necessary to provide such a parking mechanism as described above.

Further, when vehicle 1 is in the parking state on a flat surface, the rotation of transmission 6 is restricted in both the forward direction and the reverse direction. It is thus possible to ensure that vehicle 1 stops in the parking state. Further, in the case of the flat surface, no load due to its own weight is applied to vehicle 1. Thus, even when the rotation of transmission 6 is restricted in both the forward direction and the reverse direction, there is no problem related to the manipulability at the time of parking release.

Note that in the above-described embodiment, when vehicle 1 enters the parking state on the flat surface, the rotation of transmission 6 is restricted in both the forward direction and the reverse direction. However, the present disclosure is not limited to this. For example, regarding the restriction release state in a case where vehicle 1 enters the parking state on a flat surface, restriction mechanism 10 may restrict the rotation of transmission 6 through a mechanism different from restriction mechanism 10.

Examples of the mechanism different from restriction mechanism 10 include the general parking mechanism described above, for example.

Vehicle 1 does not descend due to its own weight on the flat surface unlike on the inclined road surface. Thus, no load such as that occurring on the inclined road surface is applied in the parking state. Accordingly, the parking mechanism can be made relatively small in size even when the parking mechanism described above is disposed. Thus, the degree of influence on an arrangement space around transmission 6 is small.

In the above embodiment, restriction mechanism 10 is disposed on propeller shaft 2 (output shaft of transmission 6), but the present disclosure is not limited thereto. For example, the restriction mechanism may also be disposed on the upstream side of differential gear 3.

Further, in the above embodiment, the one-way clutch mechanism having two selectable one-way clutches is described as an example of restriction mechanism 10, but the present disclosure is not limited thereto. For example, as the restriction mechanism, a one-way clutch mechanism may be used which includes a single one-way clutch, and which makes it possible to achieve three rotation restriction states in the forward direction, in the reverse direction, and in both the forward direction and the reverse direction with the one-way clutch.

Further, in the above embodiment, rotation restriction control apparatus 100 includes judgement section 110, selection section 120, and control section 130, but the present disclosure is not limited thereto. The judgement section, the selection section, and the control section may be separately disposed.

In the above-described embodiment, judgement section 110 judges the road surface, but the present disclosure is not limited to this. Information on the road surface may be obtained from an apparatus different from the rotation restriction control apparatus.

In addition, the aforementioned embodiments merely describe examples of implementations for practicing the present disclosure, and should not be construed as limiting the technical scope of the present disclosure. In other words, the present disclosure can be implemented in various forms without departing from the scope, or essential features thereof.

This application is based on Japanese Patent Application No. 2020-098570, filed on Jun. 5, 2020, the disclosure of which is incorporated herein by reference in its entirety.

INDUSTRIAL APPLICABILITY

The rotation restriction control apparatus of the present disclosure is useful as a rotation restriction control apparatus, a rotation restriction apparatus, and a vehicle capable of improving manipulability at the time of parking release.

REFERENCE SIGNS LIST

1 Vehicle
2 Propeller shaft
3 Differential gear
4 Drive wheels
5 Engine
6 Transmission
7 Gradient sensor
8 Parking signal output section
10 Restriction mechanism
11 First one-way clutch
12 Second one-way clutch
100 Rotation restriction control apparatus
110 Judgement section
120 Selection section
130 Control section

The invention claimed is:

1. A rotation restriction control apparatus for a vehicle including a first one-way clutch and a second one-way clutch in which a rotation restriction state is selectable from among at least two states including a first state in which rotation only in a forward direction is restricted in a gearbox and a second state in which rotation only in a reverse direction is restricted in the gearbox, the rotation restriction control apparatus comprising:
a selection section that selects the rotation restriction state based on a road surface on which the vehicle travels and where the vehicle enters a parking state; and
a control section that controls the rotation restriction state of the first one-way clutch and the second one-way clutch depending on a selection result of the selection section when the vehicle enters the parking state.

2. The rotation restriction control apparatus according to claim 1, wherein
the selection section is configured to:
select the first state when the road surface is a downward inclined surface, and
select the second state when the road surface is an upward inclined surface.

3. The rotation restriction control apparatus according to claim 2, wherein:
in the first one-way clutch and the second one-way clutch, the rotation restriction state is selectable from among the first state, the second state, and a third state in which rotation in both of the forward direction and the reverse direction is restricted in the gearbox, and
the selection section selects the third state when the road surface is a flat surface.

4. A vehicle, comprising:
a gearbox;
a first one-way clutch and a second one-way clutch disposed on a power transmission side of a gearbox mounted in a vehicle and in which a rotation restriction state is selectable from among at least two states including a first state in which rotation only in a forward direction is restricted in the gearbox and a second state in which rotation only in a reverse direction is restricted in the gearbox; and a rotation restriction control apparatus according to claim 1.

5. The vehicle according to claim 4, wherein the first one-way clutch and the second one-way clutch are selectable one-way clutches in which the rotation restriction state is selectable from among the at least two states including the first state and the second state, wherein the first one-way clutch restricts rotation of the gearbox in the forward direction, and wherein the second one-way clutch restricts rotation of the gearbox in the reverse direction.

6. The vehicle according to claim 4, wherein the first one-way clutch and the second one-way clutch are disposed on a propeller shaft to which power is transmitted from the gearbox.

\* \* \* \* \*